(12) United States Patent
DeMartino et al.

(10) Patent No.: US 11,091,392 B2
(45) Date of Patent: Aug. 17, 2021

(54) GLASS PACKAGING ENSURING CONTAINER INTEGRITY

(71) Applicant: CORNING INCORPORATED, Corning, NY (US)

(72) Inventors: Steven Edward DeMartino, Painted Post, NY (US); Robert Anthony Schaut, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 113 days.

(21) Appl. No.: 15/814,917

(22) Filed: Nov. 16, 2017

(65) Prior Publication Data

US 2018/0079682 A1    Mar. 22, 2018

Related U.S. Application Data

(62) Division of application No. 13/778,975, filed on Feb. 27, 2013, now Pat. No. 9,850,162.

(Continued)

(51) Int. Cl.
*C03C 21/00* (2006.01)
*A61J 1/14* (2006.01)
(Continued)

(52) U.S. Cl.
CPC .......... *C03C 21/002* (2013.01); *A61J 1/1468* (2015.05); *B32B 17/06* (2013.01); *B65D 1/40* (2013.01);
(Continued)

(58) Field of Classification Search
CPC ....... A61J 1/00; A61J 1/1468; Y10T 428/131; Y10T 428/315; C03C 21/002; C03C 17/25
See application file for complete search history.

(56) References Cited

U.S. PATENT DOCUMENTS

| 1,115,972 A | 11/1914 | Potter |
| 2,344,630 A | 3/1944 | Mylchreest |

(Continued)

FOREIGN PATENT DOCUMENTS

| CN | 102123960 A | 7/2011 |
| GB | 1115972 A | 6/1968 |

(Continued)

OTHER PUBLICATIONS

International Preliminary Report on Patentability dated Sep. 12, 2014 for PCT/US20131028184 filed Feb. 28, 2013. pp. 1-10.

(Continued)

*Primary Examiner* — Gerard Higgins
(74) *Attorney, Agent, or Firm* — Dinsmore & Shohl LLP

(57) ABSTRACT

A strengthened glass container or vessel such as, but not limited to, vials for holding pharmaceutical products or vaccines in a hermetic and/or sterile state. The strengthened glass container undergoes a strengthening process that produces compression at the surface and tension within the container wall. The strengthening process is designed such that the tension within the wall is great enough to ensure catastrophic failure of the container, thus rendering the product unusable, should sterility be compromised by a through-wall crack. The tension is greater than a threshold central tension, above which catastrophic failure of the container is guaranteed, thus eliminating any potential for violation of pharmaceutical integrity.

18 Claims, 9 Drawing Sheets

Related U.S. Application Data

(60) Provisional application No. 61/604,647, filed on Feb. 29, 2012.

(51) Int. Cl.
   *C03B 27/06*   (2006.01)
   *B32B 17/06*   (2006.01)
   *B65D 1/40*    (2006.01)
   *B65D 13/02*   (2006.01)
   *C03C 23/00*   (2006.01)
   *C03B 33/06*   (2006.01)

(52) U.S. Cl.
   CPC ............ *B65D 13/02* (2013.01); *C03B 27/065* (2013.01); *C03C 21/00* (2013.01); *C03C 21/007* (2013.01); *C03C 23/007* (2013.01); *C03B 33/06* (2013.01); *Y10T 29/49* (2015.01); *Y10T 428/131* (2015.01); *Y10T 428/1317* (2015.01); *Y10T 428/315* (2015.01)

(56) References Cited

U.S. PATENT DOCUMENTS

| | | |
|---|---|---|
| 3,574,045 A | 4/1971 | Mould |
| 3,673,049 A | 6/1972 | Giffen et al. |
| 3,728,095 A | 4/1973 | Monks et al. |
| 3,844,758 A | 10/1974 | Wartenberg |
| 3,936,287 A | 2/1976 | Beall et al. |
| 4,021,218 A | 5/1977 | Watanabe |
| 4,842,630 A | 6/1989 | Braithwaite et al. |
| 4,913,720 A | 4/1990 | Gardon et al. |
| 5,337,537 A | 8/1994 | Soughan |
| 5,559,060 A | 9/1996 | Dumbaugh, Jr. et al. |
| 7,201,965 B2 * | 4/2007 | Gulati ............... B32B 17/06 428/426 |
| 7,666,511 B2 | 2/2010 | Ellison et al. |
| 9,517,966 B2 | 12/2016 | Danielson et al. |
| 2006/0127679 A1 | 6/2006 | Gulati et al. |
| 2007/0060465 A1 | 3/2007 | Varshneya et al. |
| 2009/0197088 A1 | 8/2009 | Murata |
| 2009/0215607 A1 | 8/2009 | Dejneka et al. |
| 2010/0035038 A1 | 2/2010 | Barefoot et al. |
| 2010/0047521 A1 | 2/2010 | Amin et al. |
| 2010/0304090 A1 | 12/2010 | Henn et al. |
| 2011/0098172 A1 | 4/2011 | Brix |
| 2011/0281093 A1 | 11/2011 | Gulati et al. |
| 2011/0289975 A1 | 12/2011 | Brown et al. |
| 2013/0011650 A1 | 1/2013 | Akiba et al. |

FOREIGN PATENT DOCUMENTS

| | | |
|---|---|---|
| JP | H0551237 A | 3/1993 |
| JP | 2011093728 A | 5/2011 |
| JP | 2011093792 A | 5/2011 |
| JP | 2011136895 A | 7/2011 |
| RU | 2177188 C2 | 12/2001 |
| WO | 2000047529 A1 | 8/2000 |
| WO | 2009097123 A1 | 8/2009 |
| WO | 2011114821 A1 | 9/2011 |

OTHER PUBLICATIONS

International Search Report and Written Opinion dated Jul. 11, 2013 for PCT/US2013/028184 filed Feb. 28, 2013.
Australian first Examination Report dated Nov. 13, 2015 for AU Patent Application No. 2013226031.
Non-Final Office Action dated Jan. 29, 2016 for U.S. Appl. No. 13/778,975, filed Feb. 27, 2013. pp. 1-17.
Chinese 1st Office Action and Search Report dated Apr. 28, 2016 for CN Patent Application No. 201380021727.1.
Final Office Action dated Jul. 29, 2016 for U.S. Appl. No. 13/778,975, filed Feb. 27, 2013. pp. 1-17.
Gomez et al., "A look at the chemical strengthening process: alkali aluminosilicate glasses vs. soda-lime glass," 71st Conference on Glass Problems, Editor: Charles H. Drummond, III, The American Society, 2011, p. 62-66.
Non-Final Office Action dated Feb. 6, 2017, for U.S. Appl. No. 13/778,975, filed Feb. 27, 2013. pp. 1-18.
Russian Decision to Grant and English Translation dated Apr. 21, 2017 for RU Patent Application No. 2014138993. pp. 1-14.
Japanese Non-Final Office Action and English Translation dated Mar. 6, 2017 for JP Patent Application No. 2014-560017. pp. 1-11.
Korean 2nd Office Action and English Translation dated Apr. 30, 2018 for KR Patent Application No. 2014-7027238. pp. 1-7.
EP Communication Pursuant to Article 94(3) EPC dated Apr. 23, 2018, for EP Patent Application No. 13710682.9. pp. 1-13.
"The Elasticity of Glass" (2009) retrieved on Apr. 12, 2018 [online], URL: http://glassarmonica.com/science/elasticity_glass.php. pp. 1-2.
"The Engineering ToolBox" retrieved on Apr. 12, 2018 [online], URL: https://www.engineeringtoolbox.com/poissons-ratio-d_1224.html. pp. 1-7.
Japanese 2nd Office Action and English Translation dated Feb. 6, 2018 for JP Patent Application No. 2014-560017. pp. 1-11.

* cited by examiner

GLASS PACKAGING ENSURING CONTAINER INTEGRITY

CROSS-REFERENCE TO RELATED APPLICATIONS

This application is a divisional of U.S. patent application Ser. No. 13/778,975 filed Feb. 27, 2013, and entitled "GLASS PACKAGING ENSURING CONTAINER INTEGRITY" which itself claims the benefit of priority under 35 U.S.C. § 119 of U.S. Provisional Application Ser. No. 61/604,647 filed on Feb. 29, 2012, the contents of which are both relied upon and incorporated herein by reference in their entireties.

BACKGROUND

A concern for food and drug manufacturers is maintaining the sterility of package contents from failing during transport and storage until patient use. While glass containers are superior to many alternative materials, they are not unbreakable and occasionally experience damage from handling and transport. Cracks that extend through the wall thickness may form, compromising content sterility but not leading to catastrophic failure of the package. Such cracks may result in recalls when detected by a health care professional or end consumer at the point of use, and can be costly to the pharmaceutical or foodstuff manufacturer.

SUMMARY

The present disclosure provides a strengthened glass container or vessel such as, but not limited to, vials for holding pharmaceutical products or vaccines, and foodstuff containers (e.g., bottles, baby food jars, etc.) in a hermetic and/or sterile state. The strengthened glass container undergoes a strengthening process that produces compression at the surface and tension within the container wall. The strengthening process is designed such that the tension within the wall is great enough to ensure catastrophic failure of the container, thus rendering the product unusable, should sterility be compromised by a through-wall crack. The tension is greater than a threshold central tension, above which catastrophic failure of the container is enhanced, thus significantly reducing or eliminating any potential for violation of container integrity.

Accordingly, one aspect of the disclosure is to provide a container comprising a glass. The container has a thickness, a first surface, and a second surface. The glass has a first region under a compressive stress, the first region extending from at least one of the first surface and the second surface to a depth of layer in the glass, and a second region under a central tension, the second region extending from the depth of layer into a central region of the glass. The central tension or equivalent measure of integrated central tension or stored elastic energy is greater than a threshold tensile stress value.

A second aspect of the disclosure is to provide a glass article. The glass article has a first surface and a second surface separated by glass having a thickness. The glass article has a first region under a compressive stress, the first region extending from at least one of the first surface and the second surface to a depth of layer in the glass, and a second region under a tensile stress, the second region extending from the depth of layer into a central region of the glass. The central tension is sufficient to allow self-propagation of a crack front from the first surface to the second surface and then laterally throughout the container. The self-propagation of the crack front from the first surface to the second surface and subsequent lateral propagation of the crack front renders the glass article unsuitable for its intended use.

A third aspect of the disclosure is to provide a method of making a glass article. The method comprises: providing a glass, the glass having a first surface and a second surface separated by a thickness; forming a first region in at least one surface the glass, wherein the first region extends from at least one of the first surface and the second surface to a depth of layer in the glass; and forming a second region under a tensile stress, the second region extending from the depth of layer into a central region of the glass, wherein the central tension is sufficient to allow self-propagation of a crack front from the first surface to the second surface and then substantial lateral propagation of the crack front. The substantial lateral self-propagation of the crack front from the first surface to the second surface render the glass article unsuitable for its intended use.

A fourth aspect of the disclosure is to provide a method of ensuring self-elimination of a vessel having an intended use. The method comprises: providing the vessel, the vessel comprising a glass, the vessel having a thickness and first surface and a second surface, wherein the glass has a first region under a compressive stress, the first region extending from at least one of the first surface and the second surface to a depth of layer in the glass, and a second region under a tensile stress, the second region extending from the depth of layer, wherein the central tension is greater than a threshold tensile stress that is sufficient to allow self-propagation of a crack front through the thickness from the first surface to the second surface and substantial lateral propagation of the crack. The self-propagation of the crack front from the first surface to the second surface in a lateral direction renders the vessel unsuitable for its intended use.

These and other aspects, advantages, and salient features will become apparent from the following detailed description, the accompanying drawings, and the appended claims.

DETAILED DESCRIPTION

Figure 1:
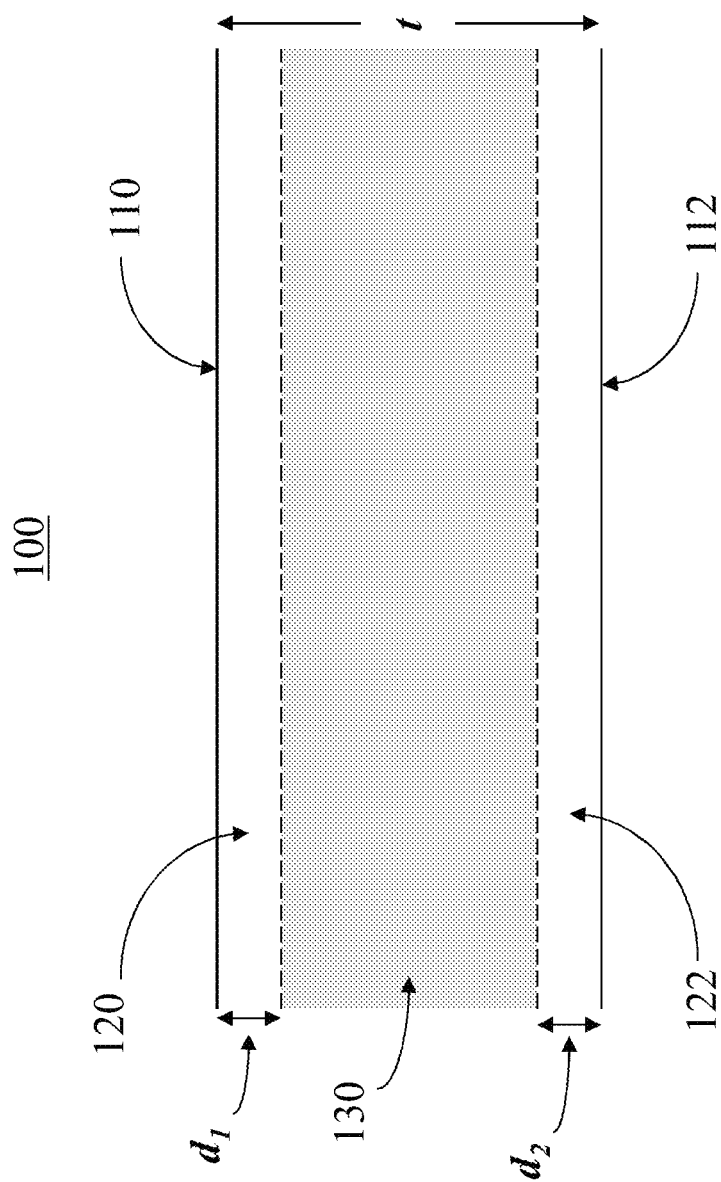
FIG. 1 is a cross-sectional schematic view of segment of a strengthened container wall.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass is a preferred material for pharmaceutical packaging for several reasons, including optical clarity, hermeticity, and chemical inertness. However, it is possible for a glass package to exhibit a through-thickness crack which can destroy the contents' hermeticity or sterility and yet still effectively contain the drug. The primary concern for this defect is possible unawareness of the pharmaceutical recipient of the non-sterility of the pharmaceutical which may, in some instances, lead to ineffectual medicinal dosage and adverse health consequences.

Described herein are a glass container and method to ensure self-elimination of containers, and the rendering of the contents such as, for example, a pharmaceutical, contained therein unusable, when cracking extension potentially violates the integrity of the container. As used herein, terms such as "container" and "vessel" refer to any article that is adapted to hold a solid or fluid for storage. The container may, in some embodiments, be sealable. The container and method rely on the release of stored elastic energy in the walls of the container. Cracks will not propagate when experiencing a net compressive stress, and only propagate when an applied tensile stress is great enough to break bonds at the flaw tip.

A container or vessel, such as a vial for holding sterile substances such as vaccines, biologics, pharmaceuticals, foodstuffs, solutions, or the like in which super-critical crack growth through the thickness of the container wall and laterally across the container surface destroys the integrity of the container, is provided. Non-limiting examples of such containers include glass vials, bottles, food jars, cartridges, syringes, ampules, or the like. The container comprises a glass. The container has at least one wall having a thickness t, a first surface, and a second surface. The at least one wall is strengthened, and the first and second surfaces are each under a compressive stress CS. The regions under compressive stress, also referred to herein as the "compressive layers," extend from the first and second surfaces, respectively, to a depth of layer DOL within the container wall. The compressive stress in the compressive layers is balanced by tensile stress, also referred to herein as "central tension" or "CT," in a central region of the wall. The central tension CT is greater than a threshold tensile stress at which crack front propagation and subsequent bifurcation or splitting—also referred to herein as "multiple crack branching"—in the glass occurs and the central tension alone (i.e., absent external stresses) is sufficient to assure destruction of the glass and the container into multiple pieces. Under such conditions, multiple crack propagation and branching occurs within a relatively short time (typically less than 24 hours), as opposed to other mechanisms, such as fatigue or the like, which may result in container failure over the span of days. In some embodiments, destruction of the container due to the above mechanism occurs in less than about one hour. In some embodiments, the threshold tensile stress is sufficient to allow self-propagation of a crack and/or multiple cracks branching through the entire thickness of the glass from the first surface to the second surface of the container. Such crack splitting ensures that a breach of the integrity of the container does not go unnoticed and elimination of such "closed container integrity" (CCI) violations. While the above descriptions describe a delay between the "insult" and the "failure event," it should be understood that at no time during this delay is the sterility compromised prior to the failure event; i.e., at no point is a through-crack stable prior to container failure.

The introduction of compressive stress into a glass container or vessel surface will increase mechanical performance of the final product. If the stored energy is great enough, flaws penetrating deeper than the compressive layer and into the tensile layer will spontaneously propagate both through the wall thickness and laterally across the wall, leading to complete failure and destruction of the contents of the container or vessel.

A cross-sectional schematic view of a segment of the strengthened container wall is shown in FIG. 1. Container wall 100 comprising at least one glass has a thickness t, first surface 110, and second surface 112. Container wall 100 has a nominal thickness t of up to about 6 mm. In some embodiments, thickness t is in a range from 0.05 mm up to about 4 mm, in other embodiments, in a range from about 0.3 mm to about 2 mm, and in still other embodiments, in a range from about 0.9 mm to about 1.5 mm. It is understood that complex packaging geometries such as vials, cartridges, and bottles may have a variety of wall thicknesses throughout the container. While the embodiment shown in FIG. 1 depicts container wall 100 as a flat planar sheet, container wall 100 may have other configurations, such as three dimensional shapes or non-planar configurations. Container wall 100 has a first compressive layer 120 extending from first surface 110 to a depth of layer $d_1$ into the bulk of the container wall 100. In the embodiment shown in FIG. 1, container wall 100 also has a second compressive layer 122 extending from second surface 112 to a second depth of layer $d_2$. Depths of layer $d_1$, $d_2$ also refer to the depth at which the stress changes from negative (compression) to positive (tension). Container wall 100 also has a central region 130 that extends from $d_1$ to $d_2$. Central region 130 is under a tensile stress or central tension (CT), which balances or counteracts the compressive stresses of first and second compressive layers 120 and 122. The depth $d_1$, $d_2$ of first and second compressive layers 120, 122 protects the container wall 100 from the propagation of flaws introduced by sharp impact to first and second surfaces 110, 112 of container wall 100, while the compressive stress minimizes the likelihood of a flaw penetrating through the depth $d_1$, $d_2$ of first and second compressive layers 120, 122. In some embodiments, the compressive stress CS in each of first region 120 and second region 122 is at least about 200 MPa and, in other embodiments, at least about 500 MPa. In some embodiments, each of depths of layer $d_1$, $d_2$ is at least about 30 µm and, in some embodiments, at least about 50 µm. In other embodiments, the depths of layer $d_1$, $d_2$ are between 15 and 25% of the wall thickness t. The relationship between CS and central tension CT is given by the expression:

$$CT=(CS \cdot DOL)/(t-2DOL). \tag{1}$$

Unless otherwise specified, central tension CT and compressive stress CS are expressed herein in megaPascals (MPa), whereas thickness t and depth of layer DOL are expressed in millimeters. The depth of the compression layer DOL and the maximum value of compressive stress CS that can be designed into or provided to a glass article are limited by frangible behavior; i.e., forceful or energetic fragmentation of the glass upon fracture.

Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The glass of the container wall 100 is strengthened by the introduction of a compressive stress. These compressive stresses must first be overcome before encapsulated flaws in the glass will experience enough tension to propagate. Such compressive stress may be introduced, for example, by thermal tempering, chemical tempering by ion exchange, lamination of glasses or glasses and plastics (e.g., glass/glass or glass/plastic/glass lamination) having different moduli and/or coefficients of thermal expansion (CTE), and/or coatings of materials having moduli and/or CTE that differ from those of the glass. In some embodiments, the glass (or glasses) forming outer regions 120, 122 of glass container 100 has a CTE that is less than that of the glass (or glasses) forming the central region of container 100. Similarly, the glass (or glasses) forming outer regions 120, 122 of glass container 100, in some embodiments, has a Young's modulus that is greater than that of the glass (or glasses) forming the central region of container 100. In some embodiments, the coating is a high-modulus coating comprising at least one inorganic material such as, but not limited to, alumina ($Al_2O_3$), silica ($SiO_2$), combinations thereof, or the like.

One consequence of the introduction of compressive stress is the complementary buildup of tensile stress in opposing regions of the container. For physical force balance to be maintained, the amount of stored elastic energy (SEE) in both compressive (e.g., 120, 122 in FIG. 1) and tensile (e.g., 130 in FIG. 1) regions (compression and tension) must be equal. In most cases, the glass surface experiences a large compressive stress, and the interior experiences a smaller magnitude tensile stress. Accordingly, the large compressive stress at the surface is focused over a shallow depth, while the smaller tensile stress is distributed over the entire container wall thickness.

The stored compressive stress of both compressive regions (120, 122 in FIG. 1) is balanced by stored tension in the central region (130) of the glass, the allowable upper limit of which is set by the frangibility limit for a given glass thickness. The frangibility limit and frangibility are described in U.S. Provisional Patent Application No. 61/657,279, filed on Jun. 8, 2012, by Kristen L. Barefoot et al., entitled "Strengthened Glass Articles and Method of Making," the contents of which are incorporated herein by reference in their entirety. As described in the above-referenced application, frangibility or frangible behavior is characterized by at least one of: breaking of the strengthened glass article (e.g., a plate or sheet) into multiple small pieces (e.g., 1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. The terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glasses described herein, such external restraints are not used in determining the frangibility or frangible behavior of the glass articles. The $CT_{limit}$ for strengthened glass in which the compressive stress profile is characterized by a single complementary error function for a given thickness t of glass can be determined by the equation $$CT_{limit} (MPa)=9.0 (MPa/mm) \cdot \ln(t) (mm)+49.3 (MPa/mm) \cdot \ln^2(t) (mm), \tag{2}$$

where the $CT_{limit}$ is in units of MPa, glass thickness t is in units of mm and less than or equal to about 1 mm, and ln(t) is the natural logarithm (base e) of the thickness t. The integrated central tension (ICT), which is the tensile stress integrated over the entire region under tension (i.e., from $d_1$ to $d_2$ in FIG. 1) may also be used to characterize fragmentation behavior.

Alternatively, the stored elastic energy density (SEE) within tensile region of the glass may be used to define fragmentation behavior. The stored elastic energy is given by the equation $$SEE=(CT^2/E) \cdot (t-2DOL) \cdot (1-v), \tag{3}$$

where E is Young's modulus, t is the thickness of the container wall, v is the Poisson's ratio of the material, and the depth of layer DOL is the depth at which the stress changes from positive (compression) to negative (tension).

Figure 2:
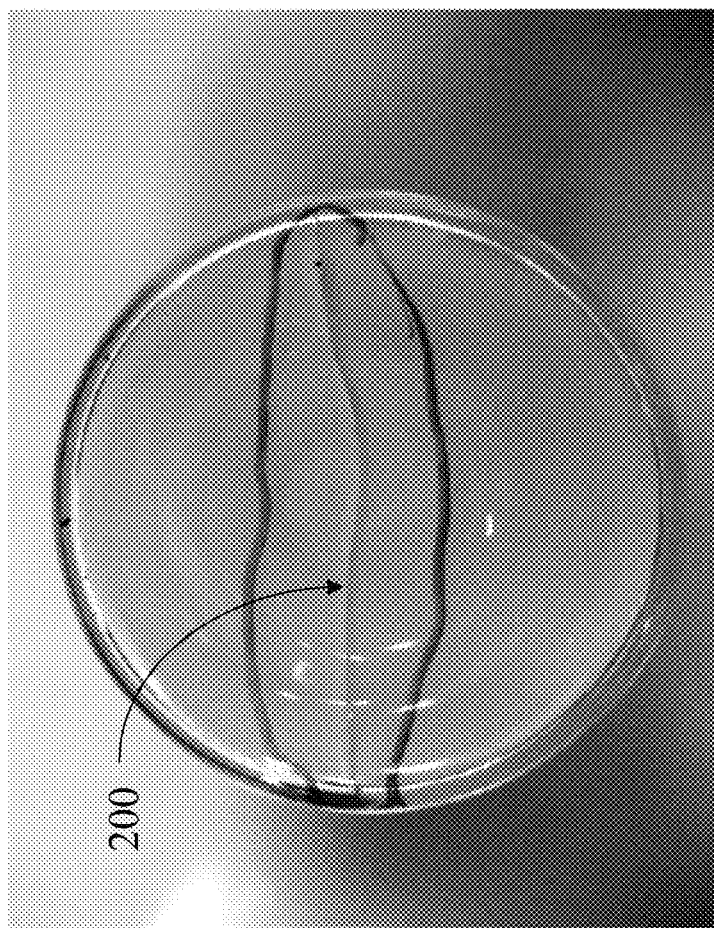
FIG. 2 is a photograph of a glass container that has experienced a through-thickness crack without catastrophic failure.

Flaws propagate under applied tensile stresses, and energy is consumed in the creation of new surface area generated by the flaw or crack. In unstrengthened glasses, energy may be dispersed in flaw propagation—including through-thickness propagation—but the crack growth will stop upon removal or consumption of the applied stress. This is the mechanism for creation of the flaw shown in FIG. 2. The glass package in FIG. 2 experienced a through-thickness crack 200 without catastrophic failure. The package contents are considered non-sterile and unfit for use due to the presence of crack 200.

Figure 3:
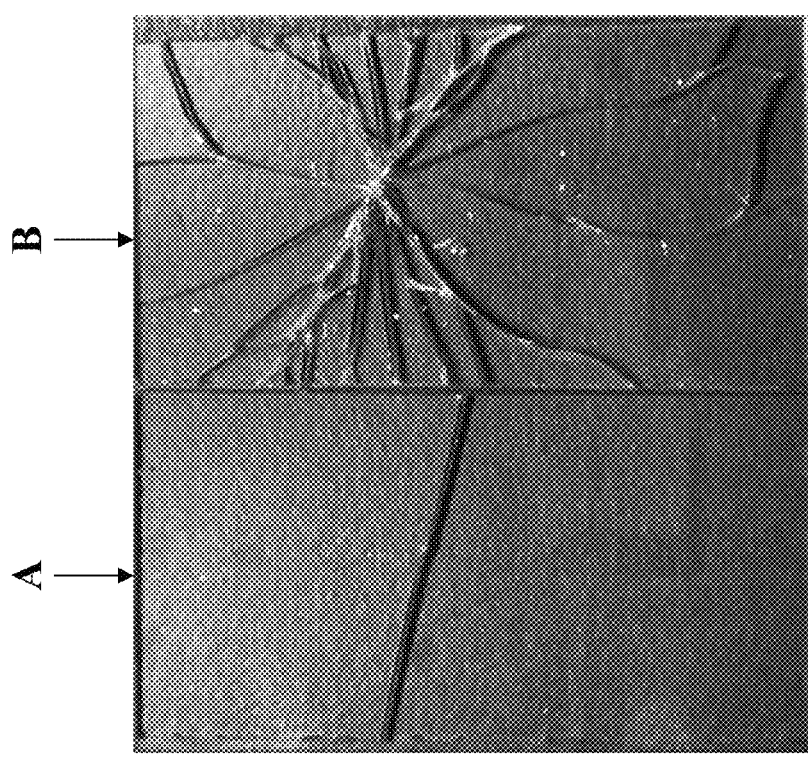
FIG. 3 is a photograph of crack propagation behavior in under-stressed and critically-stressed or frangible glasses.

In the case of strengthened glass, it is possible to engineer the stored elastic energy or corresponding central tension to be great enough so that crack fronts which extend into the tensile region will self-propagate to cause complete separation of glass and catastrophic failure of the container. This is often characterized by crack front bifurcation/crack-front splitting, where the central tension alone—absent external stresses—is sufficient to ensure destruction of the glass package into multiple pieces. Photographs of crack propagation behavior in under-stressed (A) and critically-stressed or frangible (B) glasses are shown in FIG. 3. In critically-stressed glass (B), any crack induced deeper than the depth-of-layer (into the central tension region) will propagate catastrophically, whereas only a single crack propagates in the under-stressed glass (A). In the typical non-stressed case (A), if the single crack is hidden, for example, by a label, a patient or administering professional may be unaware of the loss of sterility. In the typical strengthened and critically-stressed/frangible case (B) where when a severe flaw is initiated, complete destruction of the container is assured.

Figure 4:
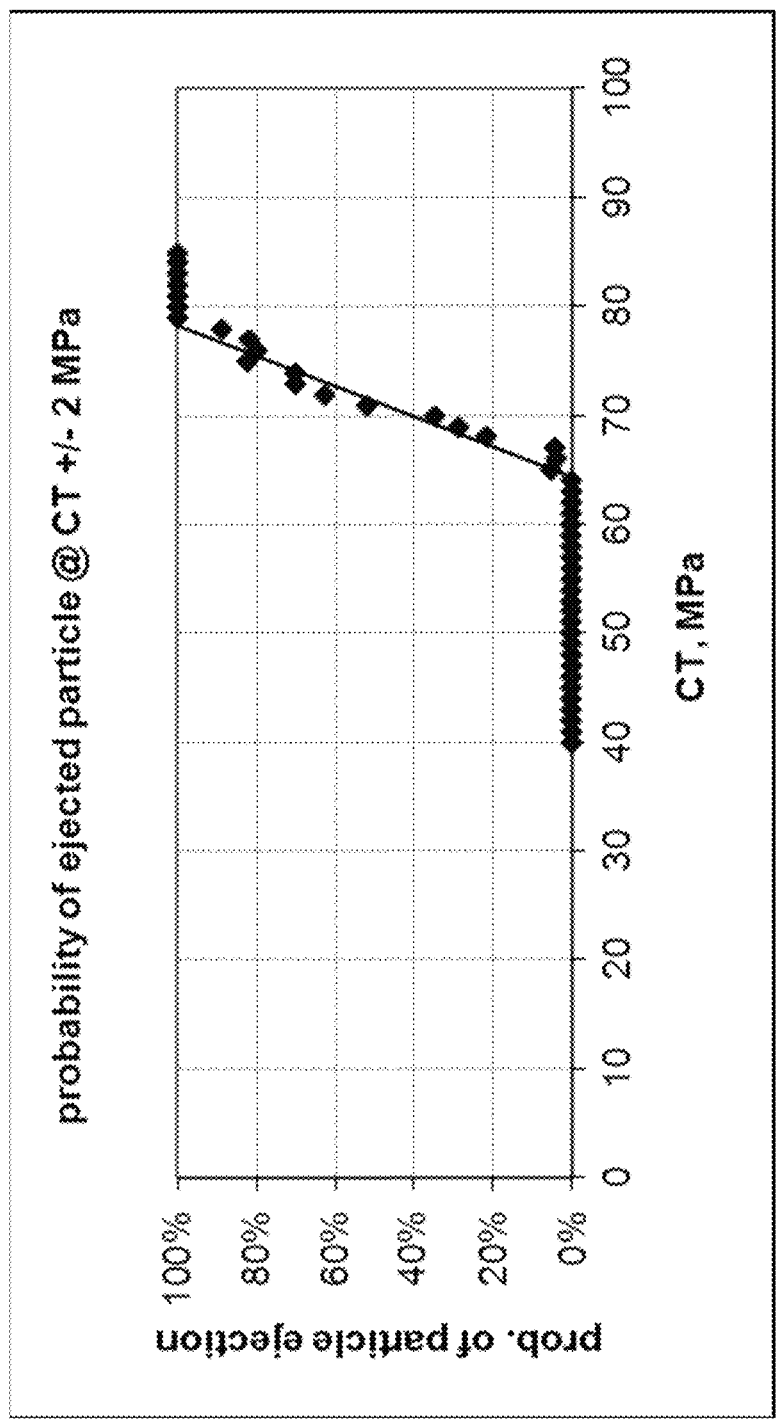
FIG. 4 is a plot of the dependence of critical/catastrophic crack growth in ion exchanged glass as a function of central tension.

The transition in behavior from sub-critical crack growth to super-critical crack growth with increasing central tension is shown in FIG. 4, which is a plot of the probability of particle ejection as a function of central tension CT of the glass. FIG. 4 illustrates the dependence of critical/catastrophic crack growth in ion exchanged glass as a function of central tension (CT). As the elastic energy stored as CT increases above a threshold value (e.g., $CT_{limit}$ in equation (2)), cracks will propagate unassisted to release the stored energy. The threshold central tension $CT_{limit}$ may be calculated using the Inglis criteria, which relates crack size to fracture toughness $K_{1C}$, which is given by the equation $$K_{1C} = Y \cdot \sigma \cdot (\pi \cdot c)^{1/2}, \qquad (4)$$

where Y is a geometric factor for crack shape, σ is the stress applied to the crack to allow crack propagation, and C is the crack length. For glass, $K_{1C}$ is about 0.7±0.05. The geometric factor Y is about 1.12 for round (half penny) cracks. Crack length c is assumed to be about one half the thickness of the wall of the glass container. For a container wall having a thickness of 1.1 mm, $CT_{limit}$ is calculated to be about 15 Mpa using equation (4).

In some embodiments, the threshold central tension $CT_{limit}$ is at least about 15 MPa, which is sufficient to cause a single crack to propagate without lateral branching. In those embodiments in which lateral branching of cracks occurs, the central tension is at least about 30 MPa and, in some embodiments, at least about 45 MPa, with the actual value depending upon the thickness of the container wall. For example, for wall thicknesses in a range from about 1 mm to about 1.2 mm, the central tension must be at least about 20 MPa for cracks (which may not be perfectly aligned with the stress field) to linearly self-propagate, and about 50 MPa in order for cracks to self-propagate with lateral branching.

For glass containers having a wall thickness in a range from about 0.5 mm to about 1.5 mm, the stored elastic energy SEE, in some embodiments, should be at least about 3.0 MPa·μm (i.e., $(CT^2/E) \cdot (t-2DOL) \cdot (1-v) \geq 3.0$ MPa·μm) in order for cracks to self-propagate laterally through the container wall. In other embodiments, SEE is at least about 9.5 MPa·μm (i.e., $(CT^2/E) \cdot (t-2DOL) \cdot (1-v) \geq 9.5$ MPa·μm) to laterally self-propagate with minimal delay between insult and separation. In other embodiments, SEE is at least 15.0 MPa·μm (i.e., $(CT^2/E) \cdot (t-2DOL) \cdot (1-v) \geq 15.0$ MPa·μm) to laterally self-propagate cracks with branching through the container wall. Table 1 lists three different levels of crack propagation and the respective central tension, integrated central tension and sored elastic energy associated with each type of behavior.

TABLE 1

Levels of crack propagation and central tension, integrated central tension, and stored elastic energy associated with each level.

| Level | | CT (MPa) | ICT (MPa · μm) | SEE (MPa · μm) |
|---|---|---|---|---|
| 1 | Crack propagation, some delayed | 15 | 15000 | 3.0 |
| 2 | Crack propagation, no delay or short delay | 30 | 30000 | 9.5 |
| 3 | Crack propagation, bifurcation | 45 | 42000 | 15.0 |

Figure 5:
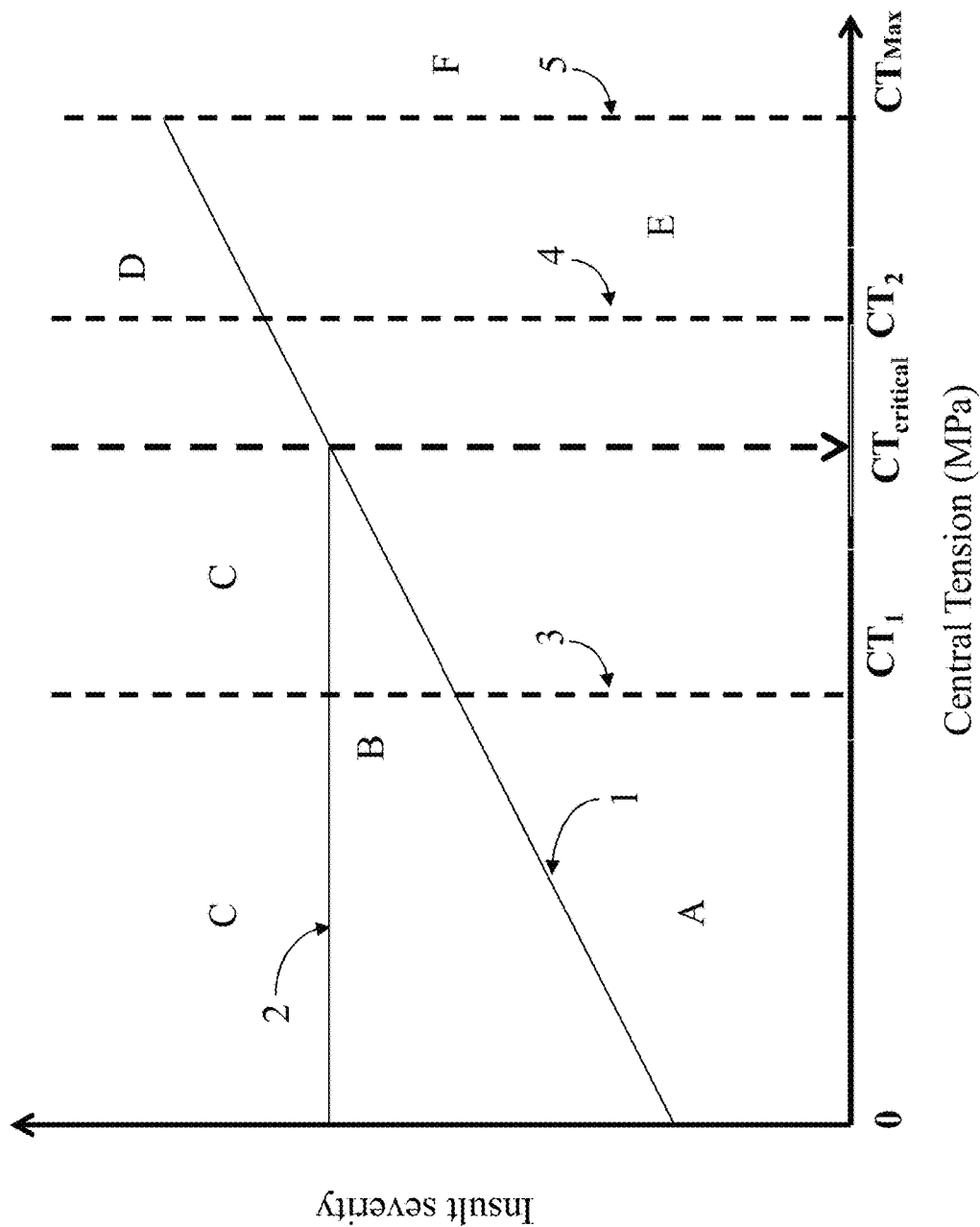
FIG. 5 is a schematic plot of insult force versus central tension showing possible breakage modes.

Types of damage incurred by glass containers depend in part upon the central tension CT within the glass and the amount of insult force applied to the glass. Possible breakage modes are shown in a schematic plot of insult force versus central tension in FIG. 5. FIG. 5 is meant to illustrate broad, qualitative behavior trends and is not intended to show well-defined force boundaries between the observed fracture states. In fact, the boundaries are quite diffuse and substantial overlap between regions is known to occur. In general, the types of damage observed may be placed in one of three categories. First, a flaw may be introduced, but the depth of the flaw is less than the thickness of the container wall (region A in FIG. 5). This may result in some surface abrasion or "scuffing" of the surface of the container wall, and occurs at lower insult forces ("insult severity" in FIG. 5) and in instances where the central tension is below a critical value $CT_{critical}$. With increasing insult force, flaws having depths that are greater than the wall thickness are introduced into the glass container (region B in FIG. 5), resulting in through-cracks and breach of container integrity, but not necessarily breakage. As CT increases, greater force must be applied to the container wall to introduce flaws that will result in through-cracks. This is represented by the boundary between the behaviors described in regions A and B, which is approximated by line 1 in FIG. 5. At higher insult forces (approximated by line 2 in FIG. 5), the glass container separates or breaks into multiple pieces (region C in FIG. 5). Beyond a maximum central tension $CT_{Max}$ (line 5 in FIG. 5) insult results in frangible behavior of (i.e., explosive or energetic breakage and ejection of fragments) of the glass (region F in FIG. 5).

Beyond $CT_{critical}$, through-cracks generally do not occur and damage is characterized by either breakage/separation of the container (region D in FIG. 5) or by the introduction of flaws that do not penetrate the thickness of the container wall (region E in FIG. 5), with the boundary between the two damage regimes approximated by line 1.

Figure 9:
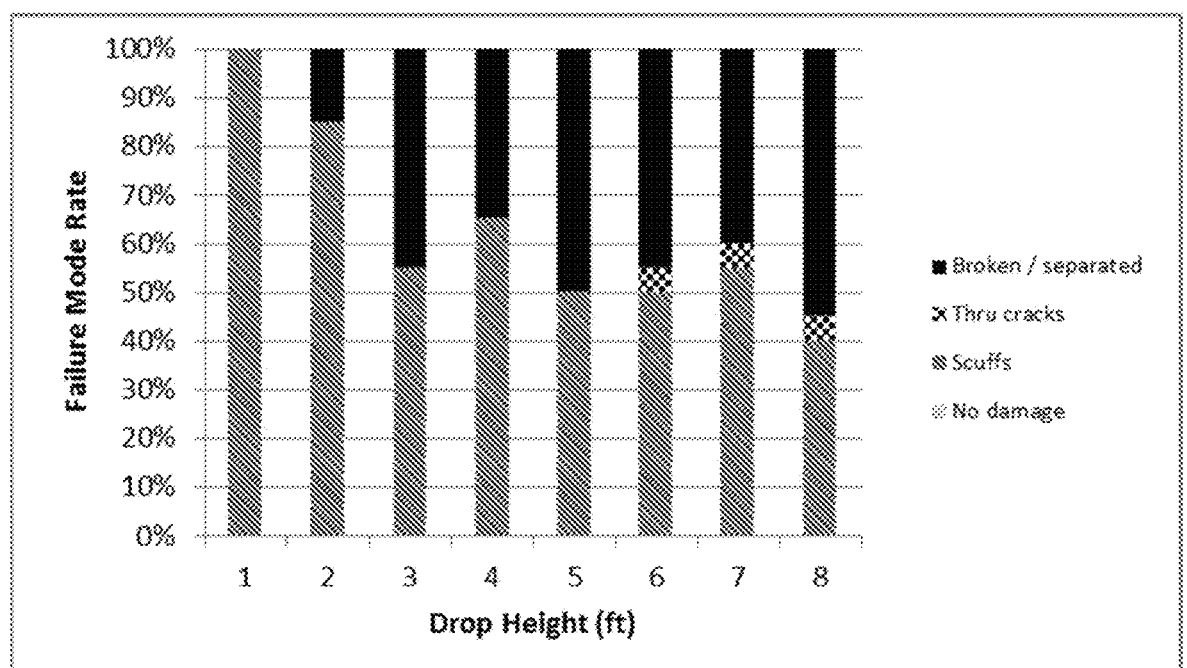
FIG. 9 is a plot of failure rate as a function of drop height.

The failure mode rate of non-ion exchanged borosilicate glass vials is plotted as a function of insult level—expressed here as drop height—in FIG. 9. As the level of insult increases, the rate of failure increases.

Borosilicate glasses (ASTM E438-92 (Standard Specification for Glasses in Laboratory Apparatus) Type 1, class A glasses—3.3 ppm/K, Type 1, class B glasses—5.1 ppm/K) that are typically used as containers for pharmaceuticals, serum, vaccines, and the like may only be strengthened to achieve a central tension $CT_1$ (line 3 in FIG. 5) that is below $CT_{critical}$ when ion exchanged for periods that are typically used. To obtain a central tension $CT_1$ that is greater than $CT_{critical}$, such glasses must be ion exchanged for at least 100 hours, which is regarded as unpractical. Such glasses are thus subject to the damage regime in which flaws may result in through-cracks, but no breakage (region B), even though this behavior may be at a low (<10%) frequency. Consequently, a breach of the container wall and compromise of the container's contents may not be detected. In contrast, the glasses described herein may be strengthened to achieve a central tension $CT_2$ (line 4 in FIG. 5) that is greater than $CT_{critical}$, and will thus be subject to damage regimes in which the container is either not compromised (the flaw depth is less than the thickness of the container) or breaks.

In some embodiments, the container comprises at least one aluminosilicate glass. In particular embodiments, the aluminosilicate glass comprises at least one alkali metal oxide. In some embodiments the container comprises a glass composition that is within the ASTM standard type 1b glass compositions.

In some embodiments, the glass container comprises a chemically durable glass such as that described in U.S. patent application Ser. No. 13/660,141, filed Oct. 25, 2012, by Melinda Drake et al., entitled "Alkaline Earth Alumino-Silicate Glass Compositions with Improved Chemical and Mechanical Durability," which claims priority from U.S. Provisional Patent Application No. 61/551,133, filed Oct. 25, 2011, and having the same title. The contents of both applications are incorporated herein by reference in their entirety. This exemplary glass composition generally includes $SiO_2$, $Al_2O_3$, at least one alkaline earth oxide, and alkali oxides including at least $Na_2O$ and $K_2O$. In some embodiments, the glass compositions may also be free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, ZnO, or the like, which may be added as fining agents and/or to further enhance the chemical durability of the glass composition. In some embodiments, the glasses described therein include from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkali oxide comprises at least $Na_2O$ and $K_2O$. In other embodiments, the glasses described therein comprise from about 67 mol % to about 75 mol % $SiO_2$; from about 6 mol % to about 10 mol % $Al_2O_3$; from about 5 mol % to about 12 mol % alkali oxide; and from about 9 mol % to about 15 mol % of alkaline earth oxide. The alkaline earth oxide comprises at least one of SrO and BaO.

In some embodiments, the glass container comprises a chemically durable glass such as that described in described in U.S. patent application Ser. No. 13/660,450, filed Oct. 25, 2012, by Paul S. Danielson et al., entitled "Glass Compositions with Improved Chemical and Mechanical Durability," which claims priority from U.S. Provisional Patent Application No. 61/551,163, filed Oct. 25, 2011, and having the same title. The contents of both applications are incorporated herein by reference in their entirety. The alkali aluminosilicate glass generally includes $SiO_2$, $Al_2O_3$, at least one alkaline earth oxide, and one or more alkali oxides, such as $Na_2O$ and/or $K_2O$, and is free from boron and compounds containing boron. The alkali aluminosilicate glass composition may also be free from phosphorous and compounds containing phosphorous. The combination of these components enables a glass composition which is resistant to chemical degradation and is also suitable for chemical strengthening by ion exchange. In some embodiments the glass compositions may further comprise minor amounts of one or more additional oxides such as, for example, $SnO_2$, $ZrO_2$, ZnO, $TiO_2$, $As_2O_3$ or the like, which may be added as fining agents and/or to further enhance the chemical durability of the glass composition. In some embodiments, such glasses may include from about 67 mol % to about 78 mol % $SiO_2$; from about 3 mol % to about 13 mol % alkaline earth oxide; X mol % $Al_2O_3$; and Y mol % alkali oxide. The alkali oxide comprises $Na_2O$ in an amount greater than 8 mol % and a ratio of Y:X which is greater than 1. In other embodiments, such glasses may comprise from about 67 mol % to about 78 mol % $SiO_2$; from about 3 mol % to about 13 mol % alkaline earth oxide, wherein the alkaline earth oxide comprises CaO in an amount greater than or equal to 0.1 mol % and less than or equal to 1.0 mol %; X mol % $Al_2O_3$, wherein X is greater than or equal to 2 mol % and less than or equal to about 10 mol %; Y mol % alkali oxide, wherein a ratio of Y:X is greater than 1. The glass compositions described in U.S. Provisional Patent Applications Nos. 61/551,163 and 61/551,133 are free from boron and compounds of boron and ion exchangeable, thereby facilitating chemically strengthening the glass to improve mechanical durability.

In other embodiments, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≥2 mol %; 2 mol % $Na_2O$≤$Al_2O_3$≤6 mol %; and 4 mol %≤($Na_2O$+$K_2O$)–$Al_2O_3$≤10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In other embodiments, the alkali aluminosilicate glass comprises: at least one of alumina and boron oxide, and at least one of an alkali metal oxide and an alkali earth metal oxide, wherein −15 mol %≤($R_2O$+R'O—$Al_2O_3$—$ZrO_2$)—$B_2O_3$≤4 mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. Pat. No. 8,158,543 by Matthew J. Dejneka et al., entitled "Glasses Having Improved Toughness and Scratch Resistance," filed Nov. 25, 2008, and claiming priority to U.S. Provisional Patent Application No. 61/004,677, filed on Nov. 29, 2008, the contents of which are incorporated herein by reference in their entirety.

In other embodiments, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol % $Li_2O+Na_2O+K_2O$ 20 mol % and 0 mol %≤MgO+ CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In other embodiments, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In other embodiments, the alkali aluminosilicate glass comprises at least 50 mol % $SiO_2$ and at least one modifier selected from the group consisting of alkali metal oxides and alkaline earth metal oxides, wherein $[(Al_2O_3 (mol\%)+B_2O_3 (mol\%))/(\Sigma alkali\ metal\ modifiers(mol\%))]>1$. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In other embodiments, the alkali aluminosilicate glass comprises $SiO_2$, $Al_2O_3$, $P_2O_5$, and at least one alkali metal oxide ($R_2O$), wherein $0.75≤[(P_2O_5(mol\%)+R_2O(mol\%))/M_2O_3(mol\%)]≤1.2$, where $M_2O_3=Al_2O_3+B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein $(M_2O_3(mol\%)/R_xO\ (mol\%))<1$, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. patent application Ser. No. 13/678,013, filed Nov. 15, 2012, by Timothy M. Gross, entitled "Ion Exchangeable Glass with High Crack Initiation Threshold," and claiming priority to U.S. Provisional Patent Application No. 61/560,434, filed Nov. 16, 2011, the contents of which are incorporated herein by reference in their entirety.

In still other embodiments, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1·Al_2O_3-28.7·B_2O_3+15.6·Na_2O-61.4·K_2O+8.1·(MgO+ZnO)≥0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,296, by Matthew J. Dejneka et al., entitled "Ion Exchangeable Glass with High Compressive Stress," filed Jun. 26, 2012, and claiming priority from U.S. Provisional Patent Ion Application No. 61/503,734, filed Jul. 1, 2011, the contents of which are incorporated herein by reference in their entirety.

In other embodiments, the alkali aluminosilicate glasses described hereinabove are ion exchangeable and comprise at least about 50 mol % $SiO_2$; at least about 10 mol % $R_2O$, wherein $R_2O$ comprises $Na_2O$; $Al_2O_3$, wherein $Al_2O_3(mol\%)<R_2O(mol\%)$; and $B_2O_3$, and wherein $B_2O_3(mol\%)-(R_2O(mol\%)-Al_2O_3(mol\%))≥3$ mol %. In some embodiments, the glass comprises: at least about 50 mol % $SiO_2$, from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %. These glasses are described in U.S. Provisional Patent Application No. 61/653,489, filed May 31, 2012, by Matthew J. Dejneka et al., and entitled "Zircon Compatible, Ion Exchangeable Glass with High Damage Resistance," the contents of which are incorporated herein by reference in their entirety.

In other embodiments, the alkali aluminosilicate glasses described hereinabove are ion exchangeable and comprise: at least about 50 mol % $SiO_2$; at least about 10 mol % $R_2O$, wherein $R_2O$ comprises $Na_2O$; $Al_2O_3$, wherein −0.5 mol % $Al_2O_3(mol\%)-R_2O(mol\%)$ 2 mol %; and $B_2O_3$, wherein $B_2O_3(mol\%)-(R_2O(mol\%)-Al_2O_3(mol\%))≥4.5$ mol %. In some embodiments, the glasses comprise: at least about 50 mol % $SiO_2$, from about 12 mol % to about 22 mol % $Al_2O_3$; from about 4.5 mol % to about 10 mol % $B_2O_3$; from about 10 mol % to about 20 mol % $Na_2O$; from 0 mol % to about 5 mol % $K_2O$; at least about 0.1 mol % MgO, ZnO, or combinations thereof, wherein 0 mol %≤MgO≤6 and 0≤ZnO≤6 mol %; and, optionally, at least one of CaO, BaO, and SrO, wherein 0 mol %≤CaO+SrO+BaO≤2 mol %. These glasses are described in U.S. Provisional Patent Application No. 61/653,485, filed May 31, 2012, by Matthew J. Dejneka et al., and entitled "Ion Exchangeable Glass with High Damage Resistance," the contents of which are incorporated herein by reference in their entirety.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise. In some embodiments, the alkali aluminosilicate glasses described hereinabove are suitable for tube drawing and re-forming from tubes and the like and have a liquidus viscosity of at least 10 kpoise and, in some embodiments, at least about 40 kpoise.

In another aspect, a method of making the glass article and container described hereinabove is provided. A glass having a first surface and a second surface separated by a thickness is first provided. The glass may comprise those compositions previously described herein, and be formed by those methods known in the art such as, but not limited to, down-drawing, including slot and/or fusion drawing, float methods, casting methods, molding processes such as, but not limited to, Vello, Danner, and blow-molding processes, or the like. A first region under compressive stress (compressive layer) extending from at least one surface of the glass to a depth of layer into the glass is formed using those means previously described herein, such as thermal tempering, chemical strengthening by ion exchange, lamination, or application of coatings to the surface of the glass. The formation of the regions under compressive stress in turn forms a second region in the glass that is under a tensile stress (central tension) as previously described herein. The central tension is sufficient to cause the self propagation of a crack from the first surface through the thickness of the glass article to the second surface and laterally across at the first surface and, in some embodiments, the second surface of the glass. In some embodiments, the central tension is greater than a threshold value of at least about 15 MPa. In other embodiments, the central tension is sufficient to cause lateral crack branching and/or is greater than a threshold value of at least about 30 MPa, in some embodiments, at least 35 MPa, and in still other embodiments, at least 50 MPa. For glass containers having a wall thickness in a range from about 0.5 mm to about 1.5 mm, the stored elastic energy SEE associated with the central tension, in some embodiments, is at least about 3.0 MPa·μm in order for cracks to self-propagate with lateral branching through the container wall. In other embodiments, SEE is at least about 9.5 MPa·μm, and, in still other embodiments, SEE is at least about 15.0 MPa·μm. The self propagation of the crack renders the glass article unsuitable for its intended use. Such intended uses include, but are not limited to, containers for substances, such as pharmaceuticals or the like, for which hermeticity and/or sterility are desired.

In another aspect, a method of ensuring self-elimination of a vessel having an intended use is provided. The method comprises providing the vessel, wherein the vessel comprises at least one glass and has a thickness and first surface and a second surface. As previously described hereinabove, the glass has a first region under a compressive stress, the first region extending from at least one of the first surface and the second surface to a depth of layer in the glass, and a second region under a tensile stress, the second region extending from the depth of layer. The central tension is greater than a threshold tensile stress that is sufficient to allow self-propagation of a crack front through the thickness from the first surface to the second surface and lateral cracking across the first surface and, in some embodiments, across the second surface. In some embodiments, the central tension is greater than a threshold value of at least about 15 MPa. In other embodiments, the central tension is sufficient to cause lateral crack branching and/or is greater than a threshold value of at least about 30 MPa, in some embodiments, at least 35 MPa, and in still other embodiments, at least 50 MPa. For glass containers having a wall thickness in a range from about 0.5 mm to about 1.5 mm, the stored elastic energy SEE associated with the central tension, in some embodiments, is at least about 11 J/m$^2$ in order for cracks to self-propagate with lateral branching through the container wall. In other embodiments, SEE is at least about 13 J/m$^2$. The self-propagation of the crack front laterally across the first surface, including bifurcation, renders the vessel unsuitable for its intended use.

As used herein, the terms "self-elimination," "failure," "unsuitable for (its) intended use," and the like mean that, after receiving an insult (e.g., impact), the contents of the container is exposed to the elements outside the container. Whether such exposure occurs is determined by those means known in the art, such as, for example, dye ingress testing. In dye ingress testing, the container to be tested is partially filled with clean, colorless water, and the container is closed and sealed as it would be in a commercial setting (e.g., with a rubber stopper, septa, crimp caps, etc.). the filled and sealed container is then submerged in a concentrated dye solution. Non-limiting examples of the dye include methylene blue, FD&C dyes, or the like. The dye solution and container are evacuated to a vacuum of greater than 20 inches Hg and held in vacuum for 15 minutes, after which the containers are exposed to ambient pressure while under the dye (allowing for ingress) for 15 minutes, then are removed from the dye solution, rinsed, dried, and visually inspected. Any coloration of the water inside the container is classified as a failure. Photospectrometric methods known in the art may be used to improve the accuracy of the visual inspection, and are capable of detecting less than about 2 ppm dye in the container. Another method of maintaining failure is described in ASTM F2338-09, "Standard Test Method for Nondestructive Detection of Leaks in Packages by Vacuum Decay Method," the contents of which are incorporated by reference in their entirety. In ASTM F2338-09, leaks in the container ate detected by measuring the rise in pressure in an enclosed evacuated test chamber containing the container due to leakage and/or volatilization of the liquid contents of the container.

The following examples illustrate the features and advantages of the glasses described herein and are in no way intended to limit the disclosure or appended claims thereto.

Drop tests were performed on cylindrical borosilicate glass vials (Schott Fiolax® clear) and alkaline earth aluminosilicate glass vials described in U.S. patent application Ser. No. 13/660,450. All vials studied had 3.00 ml nominal volume, 3.70 cm height, 16.75 mm diameter, and 1.1 mm wall thickness. The alkali aluminosilicate glass vials were ion exchanged in a KNO$_3$ (technical grade) salt bath at 450° C. for 8 hours. All vials were depyrogenated at 320° C. for 1 hr and cooled to a temperature of less than 90° C. before testing.

Figure 6:
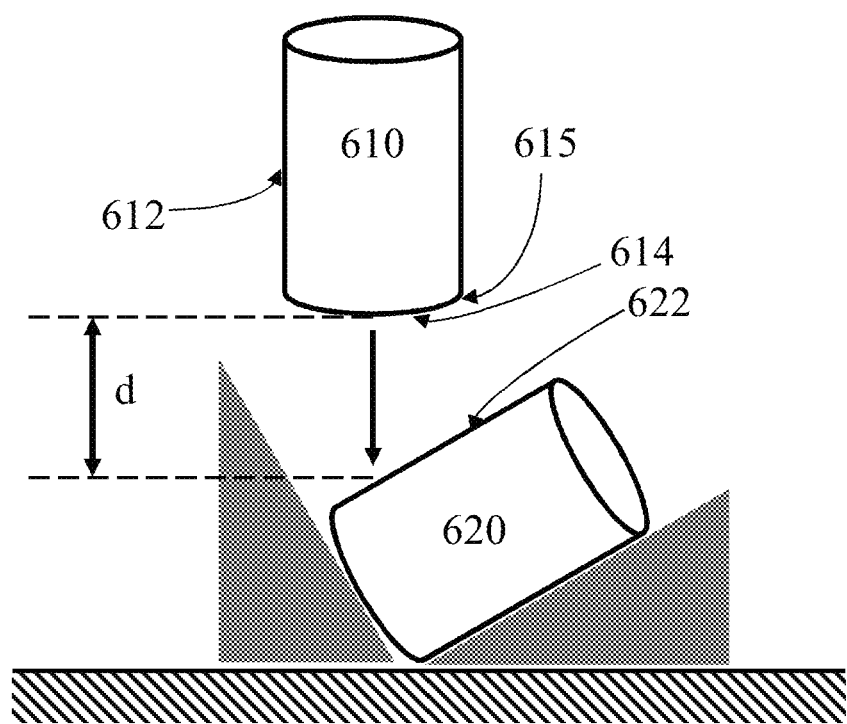
FIG. 6 is a schematic diagram of a drop test.

The drop tests were conducted as schematically shown in FIG. 6. A first vial 610 (also referred to herein as the "dropped vial") is dropped from a height d such that a portion of the "heel (i.e., the point at which the wall 612 and base 614 of the vial meet)" 615 of first vial 610 strikes a portion of the side wall 622 of a second vial 620 (also referred to herein as the "bottom vial") which is horizontally oriented (i.e., placed on its side) and inclined at ~30° from level. Both dropped vials and bottom vials had the same composition and dimensions. At least thirty vials of each glass (first vial and second vial) were dropped from a height of 8 feet. After impact both the dropped vials and bottom vials were visually inspected for damage. Damage (or failure) was classified as either superficial or "scuffing," cracking which penetrated the thickness of the vial ("through cracks"), or complete breakage or separation of the vial wall. A vial was deemed to have "survived" the drop test is the vial held and did not leak liquid after the test.

Figure 7:
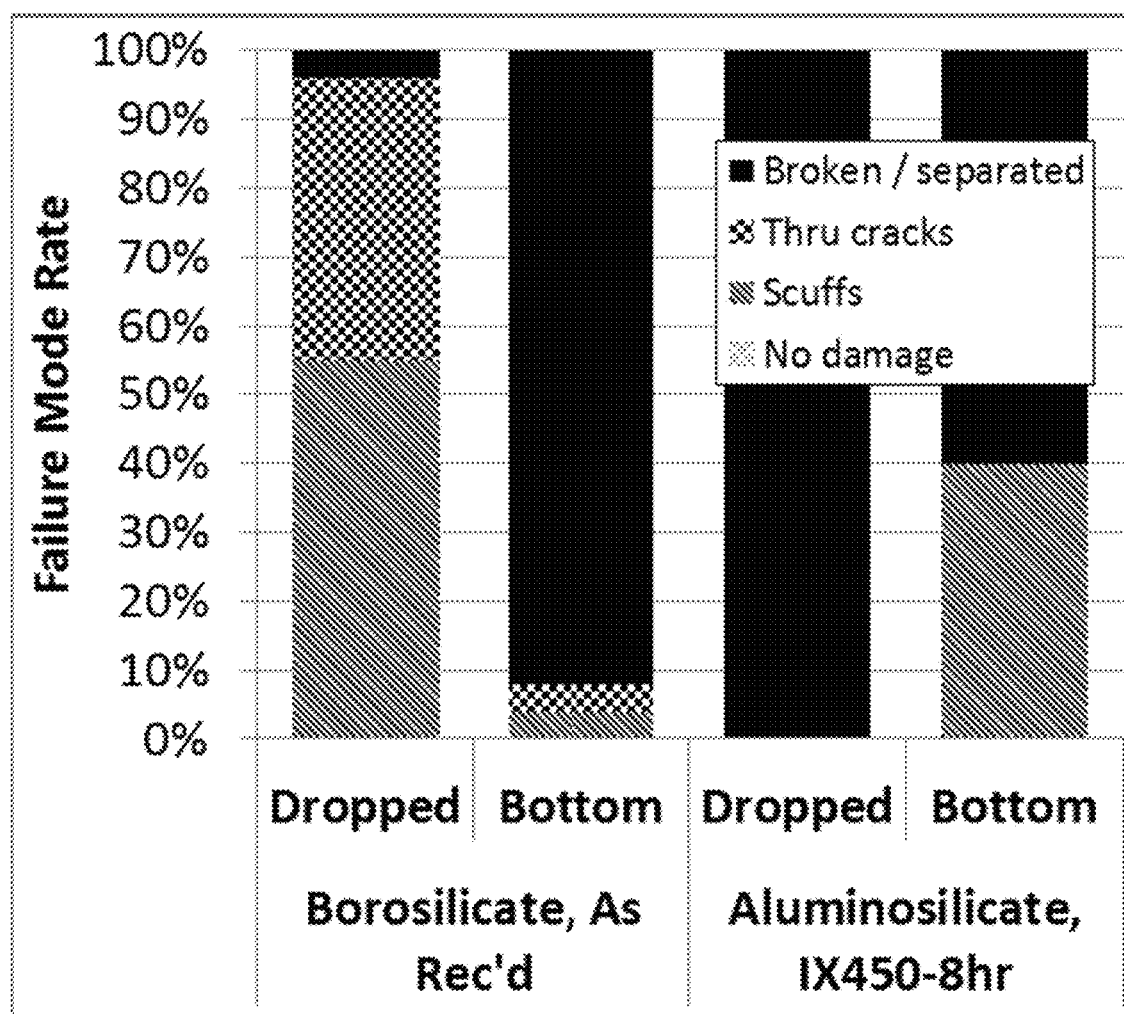
FIG. 7 is a plot of failure mode rate for dropped and bottom glass vials comparing breakage behavior for ion-exchanged alkali aluminosilicate glass and non-ion-exchanged borosilicate glass.

The frequency of each mode of damage ("failure mode rate") is plotted for dropped and bottom vials is plotted in FIG. 7 for the Type 1b borosilicate glass vials and the ion exchanged alkali aluminosilicate glass vials. The dropped borosilicate vials survived the drop test without breakage/separation at a rate of about 90%, increases the probability of compromising the integrity of the vial and making loss of integrity difficult to detect. The bottom borosilicate vials survived the drop test without breakage/separation at a rate of about 10%, making any failure that would compromise the integrity of the vial less frequent in the bottom vial. This difference in behavior is due to the drop orientation and stresses experienced during this dynamic drop test. Thus, compromised integrity could be present in about half of the population of the vials tested.

None of the dropped the ion exchanged alkali aluminosilicate glass vials exhibited a through-crack resulting from the drop test without breakage/separation, thus facilitating detection of any failure that would compromise the integrity of the dropped vial. The bottom ion exchanged alkali aluminosilicate glass vials showed the same behavior (no stable through-cracks) resulting from the drop test without breakage/separation as the dropped vials. When introduced to the alkali aluminosilicate vials, the through-cracks observed in the borosilicate glasses now result in outright breakage/separation. Compromised integrity would therefore be less likely to occur in both dropped and bottom vials of the ion exchanged alkali aluminosilicate glass, as those borosilicate glass containers having a likelihood of compromised integrity have been converted to "broken/separated" or "scuffed" in the ion exchanged alkali aluminosilicate glass population.

Figure 8:
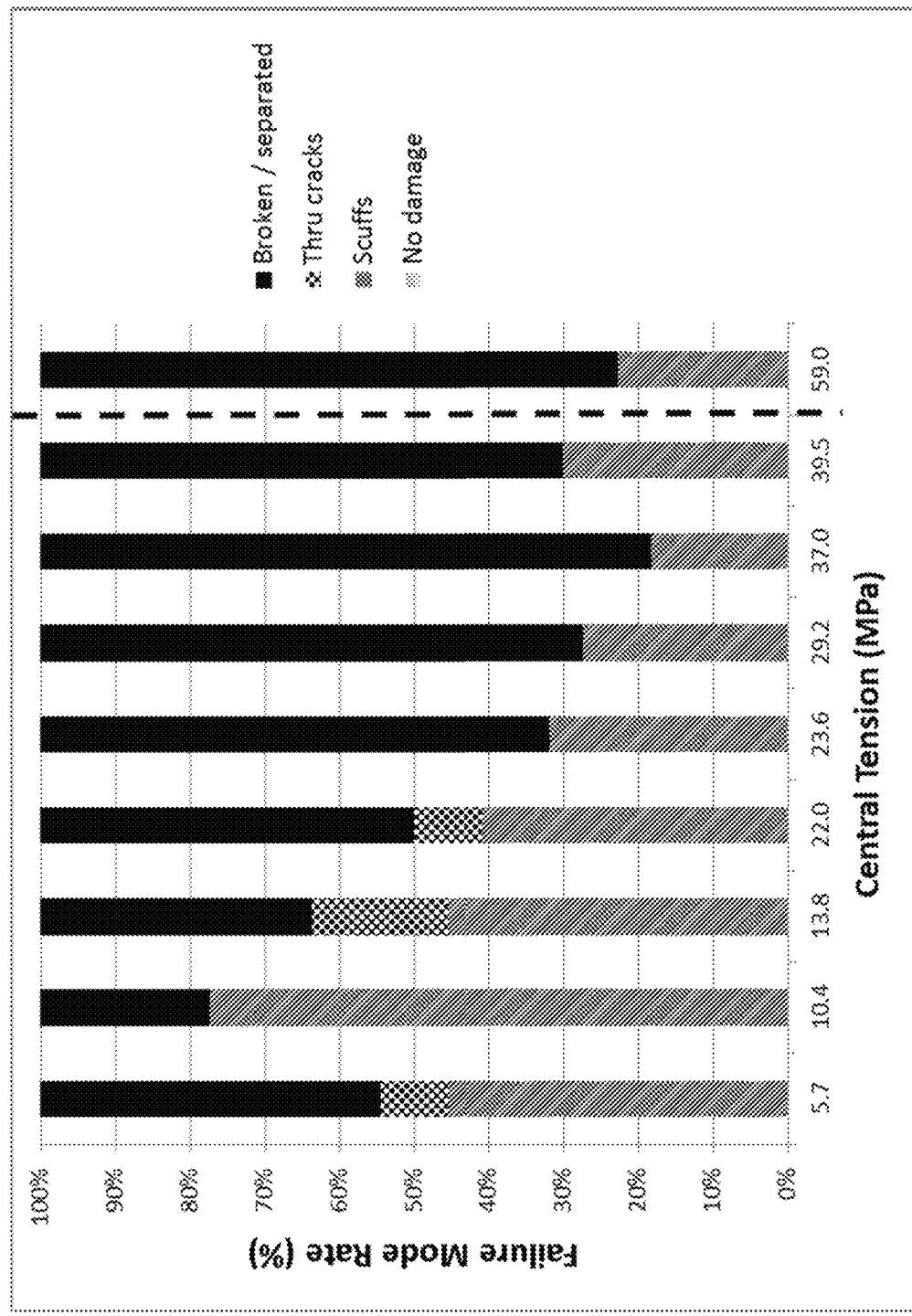
FIG. 8 is a plot of failure mode rate of glass vials as a function of central tension (corrected for stress optical coefficient (SOC), using the triangle method)

The failure mode of the ion exchanged alkali aluminosilicate glass vials is plotted as a function of central tension in FIG. 8. The vials were ion exchanged in a $KNO_3$ salt bath at 450° C. The percentage of samples that do not fail due to breakage/separation decreases from about 75% after ion exchange for less than one hour to a minimum of about 18% after ion exchange for about 15 hours. The failure (breakage/separation) rate remains relatively stable, ranging from about 70% to about 18% for central tensions ranging from about 10 MPa to about 37 MPa, which corresponds to ion exchange times ranging from 6.6 to 48 hours. Through-cracking does not occur when the central tension exceeds about 22 MPa, which corresponds to ion exchange times exceeding about 4 hours, for 1.1 mm thick samples, as the increased central tension in the central region of the vial wall drives crack propagation. Similarly, the number of samples that undergo delayed failure decreases with ion exchange time due to acceleration of crack propagation caused by increased central tension. Additionally, at CT values just above the threshold central tension, cracks may propagate at some time following the drop test (damage introduction), referred to as "delayed failure." The time to failure is less than 24 hours near the threshold CT. At slightly higher CT values, the time to failure decreases to less than one hour and, in some instances, even less than one minute. Even with delayed failure, the through-crack is never "stable." Once the flaw begins propagating due to the central tension, the flaw never stops and will lead to a condition which cannot hold fluid (i.e., separation/breakage).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making an aluminosilicate glass article having a first surface and a second surface separated by a thickness, the method comprising:
    forming a first region in at least one surface of the glass by ion-exchanging the glass, wherein the first region extends from at least one of the first surface or the second surface to a depth of layer in the glass, and wherein the first region is under a compressive stress and the thickness is from 0.9 mm to 1.2 mm; and
    forming a second region under a central tension of at least 15 MPa, the second region extending from the depth of layer, wherein the central tension is sufficient to allow self-propagation of a crack front from the first surface to the second surface and laterally across at least the first surface;
    wherein the glass article is a container adapted to hold a pharmaceutical product, a vaccine, a biologic, a foodstuff, or a solution.

2. The method of claim 1, wherein the self-propagation of the crack front from the first surface to the second surface and laterally across at least the first surface renders the glass article unsuitable for its intended use.

3. The method of claim 1, wherein the self-propagation of the crack front from the first surface to the second surface further comprises bifurcation of the crack front across at least the first surface.

4. The method of claim 1, wherein the glass has a Young's modulus E and a Poisson's ratio v, and $(CT^2/E) \cdot (t-2DOL) \cdot (1-v) \geq 3.0$ MPa·µm, where CT is the central tension, t is the thickness, and DOL is the depth of layer.

5. The method of claim 4, wherein $(CT^2/E) \cdot (t-2DOL) \cdot (1-v) \geq 9.5$ MPa·µm.

6. The method of claim 4, wherein $(CT^2/E) \cdot (t-2DOL) \cdot (1-v) \geq 15.0$ MPa·µm.

7. The method of claim 1, wherein the central tension is greater than or equal to 30 MPa.

8. The method of claim 7, wherein the central tension is greater than or equal to 45 MPa.

9. The method of claim 1, wherein the compressive stress is at least 200 MPa.

10. The method of claim 1, wherein the depth of layer is at least 30 µM.

11. The method of claim 1, wherein the depth of layer is in a range from 15% to 25% of the thickness.

12. The method of claim 1, wherein the thickness is up to 6 mm.

13. The method of claim 12, wherein the thickness is in a range from 0.3 mm to 2.0 mm.

14. A method of making a glass article comprising a glass and wherein the glass article has a first surface and a second surface separated by a thickness, the method comprising:
    forming a first region of the glass article, wherein forming the first region comprises applying a coating to at least one surface of the glass of the glass article, wherein the coating has a Young's modulus greater than the glass, wherein the first region extends from at least one of the first surface or the second surface to a depth of layer of the glass article, and wherein the first region comprises the coating and is under a compressive stress; and
    forming a second region under a central tension of at least 15 MPa, the second region extending from the depth of layer, wherein the central tension is sufficient to allow self-propagation of a crack front from the first surface to the second surface and laterally across at least the first surface.

15. The method of claim 14, the glass has a Young's modulus E and a Poisson's ratio $v$, and $(CT^2/E) \cdot (t-2DOL) \cdot (1-v) \geq 3.0$ MPa·μm, where CT is the central tension, t is the thickness, and DOL is the depth of layer.

16. The method of claim 14, wherein the glass article is a container is adapted to hold a pharmaceutical product, a vaccine, a biologic, a foodstuff, or a solution.

17. A method of ensuring self-elimination of a vessel having an intended use, the method comprising:
    providing the vessel, the vessel comprising an ion-exchanged aluminosilicate glass, the vessel having a thickness of from 0.9 mm to 1.2 mm and a first surface and a second surface, wherein the glass has a first region under a compressive stress, the first region extending from at least one of the first surface or the second surface to a depth of layer in the glass, and a second region under a central tension of at least 15 MPa, the second region extending from the depth of layer, wherein the glass has a Young's modulus E and a Poisson's ratio $v$, and $(CT^2/E) \cdot (t-2DOL) \cdot (1-v) \geq 3.0$ MPa·μm, where CT is the central tension, t is the thickness, and DOL is the depth of layer, wherein the central tension is greater than a threshold tensile stress that is sufficient to allow self-propagation of a crack front through the thickness from the first surface to the second surface, and wherein the self-propagation of the crack front from the first surface to the second surface renders the vessel unsuitable for its intended use.

18. The method of claim 17, wherein the self-propagation of the crack front from the first surface to the second surface further comprises bifurcation of the crack front across at least the first surface.

* * * * *

UNITED STATES PATENT AND TRADEMARK OFFICE
CERTIFICATE OF CORRECTION

PATENT NO. : 11,091,392 B2
APPLICATION NO. : 15/814917
DATED : August 17, 2021
INVENTOR(S) : Steven Edward DeMartino et al.

Page 1 of 1

It is certified that error appears in the above-identified patent and that said Letters Patent is hereby corrected as shown below:

In the Claims

In Column 16, Line 61, Claim 10, delete "30 µM." and insert -- 30 µm. --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*